United States Patent

Fujikawa et al.

(10) Patent No.: US 8,329,334 B2
(45) Date of Patent: Dec. 11, 2012

(54) LITHIUM SECONDARY BATTERY

(75) Inventors: Masato Fujikawa, Osaka (JP); Kohei Suzuki, Osaka (JP); Kaoru Inoue, Osaka (JP); Mikinari Shimada, Kyoto (JP)

(73) Assignee: Panasonic Corporation, Osaka (JP)

( * ) Notice: Subject to any disclaimer, the term of this patent is extended or adjusted under 35 U.S.C. 154(b) by 1233 days.

(21) Appl. No.: 11/396,656

(22) Filed: Apr. 4, 2006

(65) Prior Publication Data

US 2006/0222940 A1    Oct. 5, 2006

(30) Foreign Application Priority Data

Apr. 4, 2005   (JP) .................................. 2005-107254
Jun. 29, 2005  (JP) .................................. 2005-189409

(51) Int. Cl.
  *H01M 2/04*   (2006.01)
  *H01M 2/16*   (2006.01)
  *H01M 2/18*   (2006.01)
  *H01M 4/00*   (2006.01)
  *H01M 6/10*   (2006.01)

(52) U.S. Cl. ............. 429/176; 429/66; 429/94; 429/144

(58) Field of Classification Search .................. 429/66, 429/164, 176, 94, 144
    See application file for complete search history.

(56) References Cited

U.S. PATENT DOCUMENTS

| 5,869,208 | A * | 2/1999 | Miyasaka | 429/224 |
| 6,287,720 | B1 * | 9/2001 | Yamashita et al. | 429/131 |
| 6,365,299 | B1 | 4/2002 | Miyaki et al. | |
| 2002/0114993 | A1 | 8/2002 | Miyaki et al. | |
| 2004/0115521 | A1 * | 6/2004 | Cho | 429/72 |

FOREIGN PATENT DOCUMENTS

| JP | 07-220759 | 8/1995 |
| JP | 09-213366 | 8/1997 |
| JP | 11-354084 | 12/1999 |
| JP | 2004-031263 | 1/2004 |
| WO | WO 97/01870 | 1/1997 |

OTHER PUBLICATIONS

Machine translation of JP 11-354084 (Nagaura), which was made of record by Applicant.*

Japanese Office Action issued in Japanese Patent Application No. 2006-077941, mailed Jun. 10, 2010.

* cited by examiner

*Primary Examiner* — Eugenia Wang

(74) *Attorney, Agent, or Firm* — McDermott Will & Emery LLP

(57) ABSTRACT

A lithium secondary battery that is excellent in resistance to short-circuits and heat, is unlikely to suffer a capacity loss due to impact such as dropping, and has a high capacity. The lithium secondary battery includes an electrode assembly including a strip-like positive electrode and a strip-like negative electrode that are wound together with a porous heat-resistant layer interposed therebetween, a non-aqueous electrolyte, and a battery can. The battery has a restricting part for restricting vertical movement of the electrode assembly. The distance A from the restricting part to the inner bottom face of the battery can and the width B of the negative electrode satisfy the relation: $0.965 \leq B/A \leq 0.995$.

6 Claims, 2 Drawing Sheets

LITHIUM SECONDARY BATTERY

FIELD OF THE INVENTION

The present invention relates to a lithium secondary battery with a high level of safety that is excellent in resistance to short-circuits and heat. More particularly, the present invention pertains to a technique for preventing capacity loss due to impact such as dropping.

BACKGROUND OF THE INVENTION

Lithium secondary batteries have received attention as high-capacity power sources for portable and other appliances. Further, lithium secondary batteries have recently been receiving attention as high-output power sources for electric vehicles and the like. Chemical batteries such as lithium secondary batteries usually have a separator that electrically insulates a positive electrode from a negative electrode and holds an electrolyte. In the case of a lithium secondary battery, a micro-porous film made of polyolefin (e.g., polyethylene, polypropylene, etc.) is mainly used as the separator. The electrode assembly of a lithium secondary battery is produced by winding the positive electrode and the negative electrode, with the separator interposed between the two electrodes, into a cylindrical shape or a substantially elliptically cylindrical shape.

Cylindrical lithium secondary batteries are used, for example, as power sources for power tools and notebook PCs. A cylindrical lithium secondary battery is sealed by crimping the opening edge of its battery can onto the sealing plate. In order to fix the sealing plate around the open top of the battery can, the battery can has a step (narrowed part) with a reduced inner diameter in an upper part of the side wall thereof. Japanese Laid-Open Patent Publication No. Hei 11-354084 proposes a high capacity design in which the width B (38 mm) of the negative electrode and the distance A (39.7 mm) from the narrowed part to the outer bottom face of the battery can satisfy the relation: $B/A=0.957$.

Prismatic lithium secondary batteries are used, for example, as power sources for cellular phones and digital still cameras. Since prismatic lithium secondary batteries are more easily accommodated in an appliance than cylindrical ones, they are becoming increasingly popular. In the case of prismatic lithium secondary batteries, the lead connecting an electrode with a terminal easily comes into contact with the battery can, unlike cylindrical ones. If the lead whose polarity is opposite to that of the battery can comes into contact with the battery can, a short-circuit occurs. It is thus common to place an insulator (hereinafter referred to as an upper insulator) between the upper part of the electrode assembly and the lid (insulating plate) of the battery can. In order to further enhance the resistance to short-circuits, Japanese Laid-Open Patent Publication No. 2004-31263 also proposes providing an insulator (hereinafter referred to as a lower insulator) between the lower part of the electrode assembly and the bottom of the battery can.

The electrode assembly of a prismatic lithium secondary battery is usually produced such that the distance A from the lower face of the upper insulator to the inner bottom face of the battery can and the negative electrode width B satisfy the relation: $B/A \leq 0.96$. The higher the B/A ratio, the higher the battery capacity can be. However, if the B/A ratio is too high, the electrode assembly is susceptible to distortion, thereby causing a direct contact between the positive electrode and the negative electrode, i.e., a short-circuit. In No. 2004-31263, the B/A ratio is set to as high as 0.97 by providing the lower insulator that serves as a cushion.

Meanwhile, when a lithium secondary battery is stored in an environment at extremely high temperatures for an extended period of time, its separator made of a micro-porous film tends to shrink. If the separator shrinks, then the positive electrode and the negative electrode may physically come into contact with each other to cause an internal short-circuit. In view of the recent tendency of separators becoming thinner with an increase in lithium secondary battery capacity, preventing an internal short-circuit becomes particularly important. Once an internal short-circuit occurs, the short-circuit may expand due to Joule's heat generated by the short-circuit current, thereby resulting in overheating of the battery.

Thus, in the event of an internal short-circuit, in order to suppress such expansion of the short-circuit, Japanese Laid-Open Patent Publication No. Hei 7-220759 proposes forming a porous heat-resistant layer that contains an inorganic filler (solid fine particles) and a binder on an electrode active material layer. Alumina, silica, or the like is used as the inorganic filler. The inorganic filler is filled in the porous heat-resistant layer where the filler particles are bonded to one another with a relatively small amount of a binder. Since the porous heat-resistant layer is resistant to shrinking even at high temperature, it has the function of suppressing the overheating of the battery in the event of an internal short-circuit.

In order to realize a lithium secondary battery with high capacity and excellent resistance to short-circuits, the proposal of No. Hei 11-354084 or No. 2004-31263 can be combined with the proposal of No. Hei 7-220759. This combination significantly reduces internal short-circuits, but causes a significant capacity loss when the battery is subjected to an impact, for example, when dropped.

In view of the above problems, an object of the present invention is to provide a lithium secondary battery that is excellent in resistance to short-circuits, capable of preventing a capacity loss due to dropping, and capable of a high capacity design.

BRIEF SUMMARY OF THE INVENTION

The present invention relates to a lithium secondary battery including: a battery can having a bottom, a side wall, and an open top; an electrode assembly; a non-aqueous electrolyte; and a sealing plate covering the open top of the battery can that accommodates the electrode assembly and the electrolyte. The electrode assembly includes a strip-like positive electrode and a strip-like negative electrode that are wound together with a porous heat-resistant layer interposed between the positive and negative electrodes. The positive electrode includes a positive electrode core member and a positive electrode active material layer carried on the core member, and the negative electrode includes a negative electrode core member and a negative electrode active material layer carried on the core member. The battery has a restricting part for restricting vertical movement of the electrode assembly, and the distance A from the restricting part to the inner face of the bottom of the battery can and the width B of the negative electrode satisfy the relation: $0.965 \leq B/A \leq 0.995$.

The inner surface of the bottom of the battery can may have slight depressions and projections. However, in such cases, the difference in height between the depressions and the projections is usually not greater than 0.05 mm and therefore negligible. Also, the width B of the negative electrode refers to the length of the shorter side of the strip-like negative electrode. That is, the width B of the negative electrode corresponds to the maximum height of the electrode portion of the columnar electrode assembly.

The lithium secondary battery in accordance with the present invention may have a separator comprising a micro-porous film between the porous heat-resistant layer and the positive electrode or between the porous heat-resistant layer and the negative electrode.

The porous heat-resistant layer is formed, for example, on a surface of at least one of the positive electrode active material layer and the negative electrode active material layer.

The porous heat-resistant layer includes, for example, an insulating filler and a binder. The amount of the binder is preferably 1 to 10 parts by weight per 100 parts by weight of the insulating filler. The porous heat-resistant layer preferably has a porosity of 40 to 80%.

The insulating filler preferably comprises an inorganic oxide. The inorganic oxide preferably comprises at least one selected from the group consisting of alumina, silica, magnesia, titania, and zirconia.

When the electrode assembly is substantially cylindrical and the battery can is cylindrical, the restricting part is preferably a step of the battery can with a reduced inner diameter that is provided in an upper part of the side wall of the battery can. When the distance A changes depending on the depth of the reduced-diameter step, the distance from the deepest part of the step (the most protruded part toward the center of the battery can) to the inner face of the bottom of the battery can is the distance A.

The lithium secondary battery in accordance with the present invention may have an insulator that is positioned between the electrode assembly and the sealing plate. In this case, when the electrode assembly is substantially elliptically cylindrical and the battery can is prismatic, the restricting part is preferably a lower face of the insulator. In the case of a prismatic lithium secondary battery, the distance A from the restricting part to the inner face of the bottom of the battery can and the width B of the negative electrode preferably satisfy the relation: $0.975 \leq B/A \leq 0.995$.

The present invention makes it possible to provide a lithium secondary battery that is excellent in resistance to short-circuits and heat, is unlikely to suffer a capacity loss due to impact such as dropping, and provides a high capacity.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
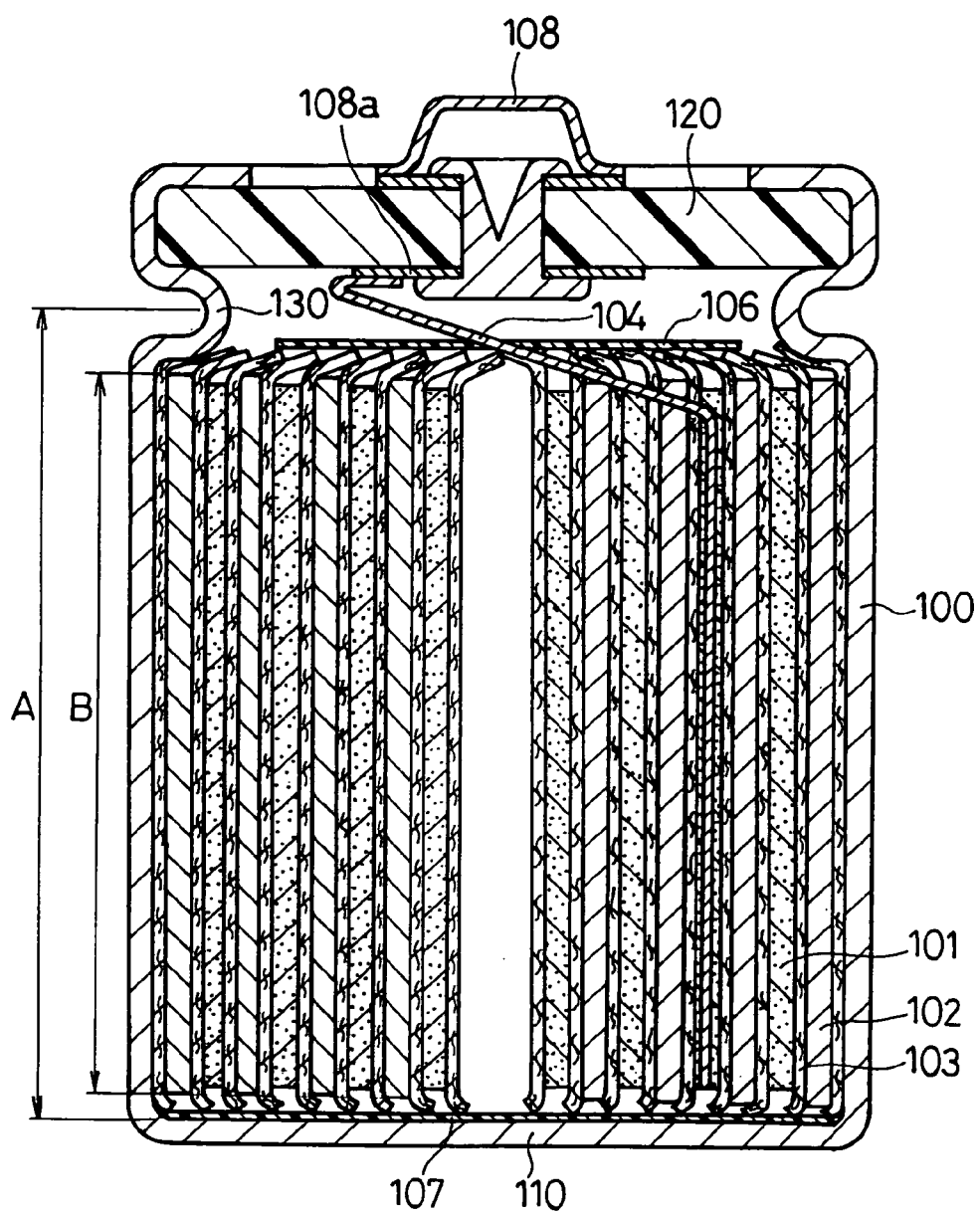
FIG. 1 is a schematic sectional view of an exemplary cylindrical lithium secondary battery in accordance with the present invention.

The present invention relates to a lithium secondary battery including: a battery can having a bottom, a side wall, and an open top; an electrode assembly; a non-aqueous electrolyte; and a sealing plate covering the open top of the battery can that accommodates the electrode assembly and the electrolyte. The electrode assembly includes a strip-like positive electrode and a strip-like negative electrode that are wound together with a porous heat-resistant layer interposed between the positive and negative electrodes. The positive electrode includes a positive electrode core member and a positive electrode active material layer carried on the core member, and the negative electrode includes a negative electrode core member and a negative electrode active material layer carried on the core member. The battery has a restricting part for restricting vertical movement of the electrode assembly, and the distance A from the restricting part to the inner face of the bottom of the battery can and the width B of the negative electrode satisfy the relation: $0.965 \leq B/A \leq 0.995$.

The present inventors have diligently researched electrode assemblies with a porous heat-resistant layer and obtained the following two findings.

First, an electrode assembly with a porous heat-resistant layer undergoes a smaller deformation during charge/discharge than a conventional electrode assembly without a porous heat-resistant layer. This is probably because the porous heat-resistant layer has a lower surface smoothness than the positive electrode, the negative electrode, and the separator and thus the electrodes and the separator are unlikely to slip or be displaced.

Second, when an electrode assembly does not undergo a suitable deformation, the electrode assembly is unlikely to be firmly secured in the battery can. Thus, if such a battery is dropped, the electrodes in the electrode assembly may be displaced, thereby resulting in a capacity loss.

Based of these findings, in the present invention, the ratio of the negative electrode width B to the distance A from the restricting part to the inner face of the bottom of the battery can (B/A ratio) is set to a higher range than the conventional one. When the B/A ratio satisfies the relation: $0.965 \leq B/A \leq 0.995$, the displacement of the electrodes in the electrode assembly particularly when the battery is dropped is significantly suppressed, so that a capacity loss is unlikely to occur.

If the B/A ratio exceeds 0.96, the distortion of the electrode assembly becomes large, which usually results in a short-circuit. Also, the width of the negative electrode of a lithium secondary battery is normally designed to be larger than the positive electrode, and hence the deformation of the negative electrode is particularly a problem. However, in the present invention where the electrode assembly has the porous heat-resistant layer, even if the edge of the negative electrode slightly deforms near the upper or lower face of the electrode assembly, a short-circuit is unlikely to occur. Therefore, the B/A ratio can be set to 0.965 or higher. According to the present invention, by making the negative electrode width close to the distance A from the restricting part to the inner face of the bottom of the battery can, it is possible to improve the resistance to dropping while realizing a high capacity.

If the B/A ratio is less than 0.965, it is difficult to realize a high capacity and, in addition, the battery is likely to suffer a capacity loss when dropped, due to displacement of the electrodes in the electorde assembly. On the other hand, if the B/A ratio exceeds 0.995, the negative electrode significantly deforms near the upper or lower face of the electrode assembly. Hence, the porous heat-resistant layer is damaged, so that an internal short-circuit tends to occur.

In so far as $0.965 \leq B/A \leq 0.995$, it is possible to obtain a lithium secondary battery that is unlikely to cause an internal short-circuit and has a high capacity and an excellent resistance to dropping.

The lithium secondary battery according to the present invention may or may not have a separator comprising a micro-porous film. The separator may be positioned between the porous heat-resistant layer and the positive electrode or between the porous heat-resistant layer and the negative electrode. The separator serves the function of supporting the structurally fragile porous heat-resistant layer. Thus, in terms of further improving the resistance to dropping, the battery desirably has a separator.

The material of the micro-porous film is preferably polyolefin, and the polyolefin is preferably polyethylene, polypropylene, or the like. A micro-porous film comprising both polyethylene and polypropylene may also be used. The thickness of the micro-porous film is preferably 8 to 20 μm in terms of ensuring the function of supporting the porous heat-resistant layer and maintaining a high capacity design.

The porous heat-resistant layer may be formed on only the surface of the positive electrode active material layer or only the surface of the negative electrode active material layer. Alternatively, it may be formed on the surface of the positive electrode active material layer and the surface of the negative electrode active material layer. However, in order to avoid an internal short-circuit in a reliable manner, the porous heat-resistant layer is desirably formed on the surface of the negative electrode active material layer that is designed to have a larger area than that of the positive electrode active material layer. Also, the porous heat-resistant layer may be formed on the active material layer on one side of the core member or may be formed on the active material layers on both sides of the core member. Further, the porous heat-resistant layer is desirably adhered to the surface of the active material layer.

The porous heat-resistant layer may be in the form of an independent sheet. However, since the porous heat-resistant layer in sheet form does not have a high mechanical strength, it may be difficult to handle. Also, the porous heat-resistant layer may be attached to the surface of the separator. However, since the separator shrinks at high temperatures, close attention must be given to manufacturing conditions of the porous heat-resistant layer. In terms of eliminating such concern, it is also desirable that the porous heat-resistant layer be formed on the surface of the positive electrode active material layer or the surface of the negative electrode active material layer.

The porous heat-resistant layer preferably contains an insulating filler and a binder. Such a porous heat-resistant layer is formed by applying a raw material paste, containing an insulating filler and a small amount of a binder, onto the surface of the electrode active material layer or separator with a doctor blade or a die coater and drying it. The raw material paste is prepared by mixing an insulating filler, a binder, and a liquid component, for example, with a double-arm kneader.

Also, the porous heat-resistant layer may be a film formed of fibers of a highly heat-resistant resin. The highly heat-resistant resin is preferably aramid, polyamide imide, etc. However, the porous heat-resistant layer comprising an insulating filler and a binder has a higher structural strength, due to the action of the binder, than the film formed of fibers of a highly heat-resistant resin and is preferable.

The thickness of the porous heat-resistant layer is preferably 0.5 to 20 μm, and more preferably 1 to 10 μm. If the thickness of the porous heat-resistant layer is less than 0.5 μm, the effect of suppressing the internal short-circuit decreases. Also, if the thickness exceeds 20 μm, there is an excessively large distance between the positive electrode and the negative electrode, which may result in degradation of the output characteristics.

The insulating filler may comprise fibers or beads of the highly heat-resistant resin, but it preferably comprises an inorganic oxide. Since inorganic oxides are hard, they can maintain the distance between the positive electrode and the negative electrode in an appropriate range even if the electrode expands due to charge/discharge. Among inorganic oxides, for example, alumina, silica, magnesia, titania, and zirconia are particularly preferable, because they are electrochemically highly stable in the operating environment of lithium secondary batteries. They may be used singly or in combination of two or more of them.

In the porous heat-resistant layer comprising such an insulating filler and a binder, the amount of the binder is preferably 1 to 10 parts by weight, more preferably 2 to 8 parts by weight, per 100 parts by weight of the insulating filler, in order to maintain its mechanical strength and its ionic conductivity. Most binders and thickeners inherently swell with an electrolyte containing a non-aqueous solvent. Thus, if the amount of the binder exceeds 10 parts by weight, the binder swells excessively to close the pores of the porous heat-resistant layer, so that the ionic conductivity may lower and the battery reaction may be impeded. On the other hand, if the amount of the binder is less than 1 part by weight, the mechanical strength of the porous heat-resistant layer may degrade.

The binder used in the porous heat-resistant layer is not particularly limited, but polyvinylidene fluoride (hereinafter referred to as PVDF), polytetrafluoroethylene (hereinafter referred to as PTFE), and polyacrylic acid-type rubber particles (e.g., BM-500B (trade name) available from Zeon Corporation), for example, are preferred. It is preferred to use PTFE or BM-500B in combination with a thickener. The thickener is not particularly limited, but carboxymethyl cellulose (hereinafter referred to as CMC), polyethylene oxide (hereinafter referred to as PEO), and modified acrylonitrile rubber (e.g., BM-720H (trade name) available from Zeon Corporation) are preferred, for example.

The porosity of the porous heat-resistant layer comprising the insulating filler and the binder is preferably 40 to 80%, more preferably 45 to 65%, in order to maintain its mechanical strength and improve its resistance to dropping. The porous heat-resistant layer has a lower surface smoothness than the positive electrode, the negative electrode, and the separator, so slipping (displacement) of the electrodes and the separator is excessively suppressed. Hence, the electrode assembly tends to be displaced. However, when the porous heat-resistant layer with a porosity of 40 to 80% is impregnated with a suitable amount of electrolyte, the electrode assembly swells to a suitable extent. As a result, the swollen electrode assembly presses the inner side wall of the battery can. When this effect obtained from the porosity of 40 to 80% is synergistically combined with the effect of optimization of the B/A ratio, the resistance to dropping is further enhanced. If the porosity is less than 40%, the electrolyte does not sufficiently permeate the porous heat-resistant layer, so the electrode assembly does not swell to a suitable extent. On the other hand, if the porosity exceeds 80%, the mechanical strength of the porous heat-resistant layer degrades.

It should be noted that the porosity of the porous heat-resistant layer can be controlled by changing the median diameter of the insulating filler, the amount of the binder, and the drying conditions of the raw material paste. For example, increasing the drying temperature or the flow rate of hot air for the drying results in a relative increase in porosity. The porosity can be calculated from, for example, the thickness of the porous heat-resistant layer, the amounts of the insulating filler and the binder, and the true specific gravities of the insulating filler and the binder. The thickness of the porous heat-resistant layer can be determined by taking an SEM photo of several cross-sections (for example, 10 cross-sections) of an electrode and averaging the thicknesses in the several cross-sections. Also, the porosity can be determined with a mercury porosimeter.

A cylindrical lithium secondary battery has a columnar (cylindrical) electrode assembly with a substantially circular cross-section. Also, the cylindrical lithium secondary battery has a cylindrical battery can 100 as illustrated in FIG. 1. The cylindrical battery can is open at one end thereof and is closed with a flat bottom 110 at the other end thereof. In the case of a common cylindrical lithium secondary battery, the opening edge of the battery can is crimped onto the circumference of a sealing plate 120 to seal the open top. In this case, the restricting part for restricting the vertical movement of the electrode assembly is a step 130 of the battery can 100 with a reduced internal diameter that is provided in an upper part of the side wall of the battery can 100. The step 130 also has the function of fixing the sealing plate 120.

Figure 2:
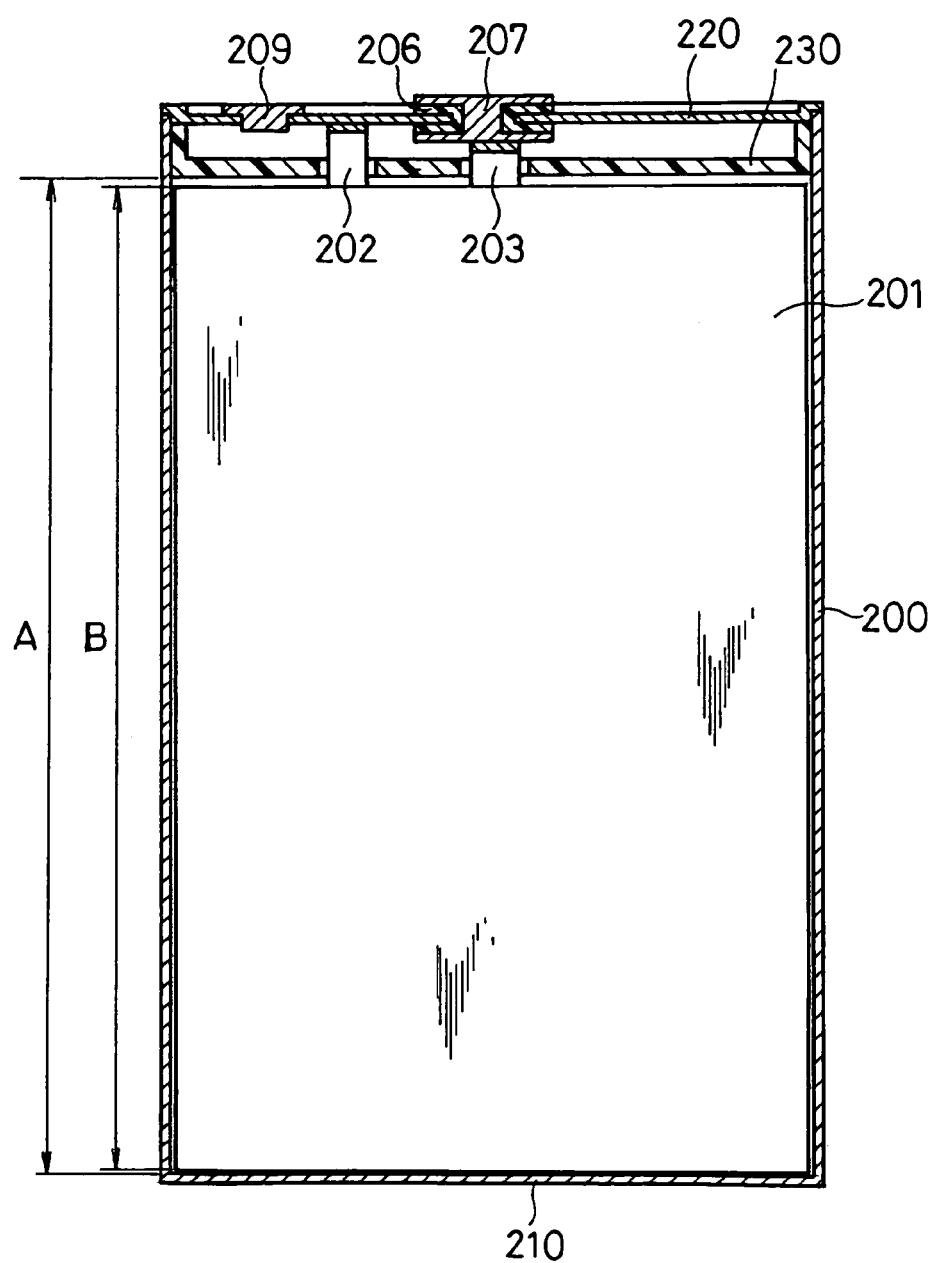
FIG. 2 is a schematic sectional view of an exemplary prismatic lithium secondary battery in accordance with the present invention.

A prismatic lithium secondary battery has a columnar (substantially elliptically cylindrical) electrode assembly with a substantially elliptic cross-section. Also, the prismatic lithium secondary battery has a prismatic (substantially rectangular) battery can 200 as illustrated in FIG. 2. The prismatic battery can is open at one end thereof and is closed with a flat bottom 210 at the other end thereof. In the case of a common prismatic lithium secondary battery, the open top of the battery can is sealed by welding its opening edge and a metal sealing plate 220 together. Also, an insulator (upper insulator) 230 is placed between the sealing plate 220 and the electrode assembly to prevent a contact between a lead of the electrode and the battery can 200. The insulator 230 has an aperture through which the electrode lead is passed, so that the insulator hardly moves. Therefore, the restricting part for restricting the vertical movement of the electrode assembly is the lower face of the insulator 230.

The thickness of the insulator is preferably in the range of 2 to 10% of the height of the battery can, in terms of assuring its function and reducing dead space.

In the case of cylindrical lithium secondary batteries, the vertical section of the step serving as the restricting part is V-shaped or U-shaped due to limitations of production methods. Thus, the distance A changes depending on the depth of the step serving as the restricting part. In this case, the distance from the deepest part of the step to the inner face of the bottom of the battery can is the distance A. In this case, if the B/A ratio is 0.965 or more, a sufficient resistance to dropping can be obtained. However, in terms of the balance between high capacity and drop resistance, it is particularly preferred that $0.970 \leq B/A \leq 0.990$ for cylindrical lithium secondary batteries.

On the other hand, in the case of prismatic lithium secondary batteries, the lower face of the insulator 230 serving as the restricting part is flat. Hence, in order to obtain excellent resistance to dropping, the B/A ratio is desirably 0.975 or more. Also, in terms of the balance between high capacity and drop resistance, it is particularly preferred that $0.975 \leq B/A \leq 0.990$ for prismatic lithium secondary batteries.

The positive electrode includes a positive electrode core member and a positive electrode active material layer carried on each side thereof. The positive electrode core member is in the form of a strip suitable for winding and comprises Al, an Al alloy, or the like. The positive electrode active material layer contains a positive electrode active material as an essential component and may contain optional components such as a conductive agent and a binder. These materials are not particularly limited, but a preferable positive electrode active material is a lithium-containing transition metal oxide. Among lithium-containing transition metal oxides, lithium cobaltate, modified lithium cobaltate, lithium nickelate, modified lithium nickelate, lithium manganate and modified lithium manganate are preferred, for example.

The negative electrode includes a negative electrode core member and a negative electrode active material layer carried on each side thereof. The negative electrode core member is in the form of a strip suitable for winding and comprises Cu, a Cu alloy, or the like. The width B of the negative electrode is equivalent to the width of the negative electrode core member. The negative electrode active material layer contains a negative electrode active material as an essential component and may contain optional components such as a conductive agent and a binder. These materials are not particularly limited, but preferable negative electrode active materials include various natural graphites, various artificial graphites, silicon-containing composite materials such as silicide, lithium metal, and various alloy materials.

Exemplary binders for the positive or negative electrode include PTFE, PVDF, and styrene butadiene rubber. Exemplary conductive agents include acetylene black, ketjen black (registered trademark), and various graphites.

The non-aqueous electrolyte preferably comprises a non-aqueous solvent and a lithium salt dissolved therein. The lithium salt is not particularly limited, but for example, $LiPF_6$ and $LiBF_4$ are preferred. Such lithium salts may be used singly or in combination of two or more of them. The non-aqueous solvent is not particularly limited, but preferable examples include ethylene carbonate (EC), dimethyl carbonate (DMC), diethyl carbonate (DEC), and ethyl methyl carbonate (EMC). Such non-aqueous solvents may be used singly or in combination of two or more of them.

The material of the battery can must be electrochemically stable in the operating voltage range of lithium secondary batteries. For example, iron or aluminum is preferably used. Also, the battery can may be plated with nickel or tin.

FIG. 1 is a schematic sectional view of an exemplary cylindrical lithium secondary battery in accordance with the present invention.

A cylindrical electrode assembly is fabricated by winding a positive electrode 101 and a negative electrode 102 with a separator 103 and a porous heat-resistant layer (not shown) interposed between the positive and negative electrodes. The separator 103 is positioned between the porous heat-resistant layer and the positive electrode 101. However, if the porous heat-resistant layer has a sufficient thickness, the separator 103 is not necessary. This electrode assembly is inserted in a cylindrical battery can 100. The battery can 100 has, in an upper part of the side wall, a step 130 where the inner diameter is reduced relative to other parts. The step 130 is formed after the electrode assembly is placed in the battery can 100. The vertical section of the step 130 is U-shaped. Thereafter, an electrolyte is injected into the battery can 100. The open top of the battery can 100 is sealed by mounting a sealing plate 120 on the step 130 and crimping the opening edge of the battery can 100 onto the circumference of the sealing plate 120.

An upper insulator plate 106 and a lower insulator plate 107, whose thicknesses are negligible, are disposed on top of and under the electrode assembly. One end of a positive electrode lead 104 is connected to the core member of the positive electrode 101, while the other end is connected to an inner terminal 108a that is provided on the lower face of the sealing plate 120. There is continuity between the inner terminal 108a and an external positive electrode terminal 108. One end of a negative electrode lead (not shown) is connected to the core member of the negative electrode 102, while the other end is connected to the inner bottom face of the battery can 100.

FIG. 2 is a schematic sectional view of an exemplary prismatic lithium secondary battery of the present invention.

A substantially elliptically cylindrical electrode assembly 201 is fabricated by winding a positive electrode and a negative electrode with a separator and a porous heat-resistant layer interposed therebetween. The electrode assembly 201 is inserted into a substantially rectangular (prismatic) battery can 200. After the electrode assembly 201 is placed in the battery can 200, an insulator 230 is mounted on top of the electrode assembly 201 to prevent a short-circuit between the battery can 200 or a positive electrode lead 202 and a negative electrode lead 203. The insulator 230 is secured near the opening of the battery can 200.

A sealing plate 220 is equipped with a negative electrode terminal 207, around which an insulating gasket 206 is fitted. The negative electrode lead 203 is connected to the negative electrode terminal 207, while the positive electrode lead 202 is connected to the lower face of the sealing plate 220.

An electrolyte is injected into battery can 200 from an injection hole of the sealing plate 220, and the injection hole is closed with a sealing stopper 209 by welding. The open top of the battery can 200 is sealed by fitting the sealing plate 220 and laser-welding the opening edge and the sealing plate 220.

The present invention is hereinafter described more specifically by way of Examples.

EXAMPLE 1

In this example, a cylindrical lithium secondary battery as illustrated in FIG. 1 is described.

(Battery 1)

(i) Preparation of Positive Electrode

A positive electrode mixture paste was prepared by stirring 3 kg of lithium cobaltate, 1 kg of PVDF#1320 available from Kureha Chemical Industry Co., Ltd. (N-methyl-2-pyrrolidone (hereinafter referred to as NMP) solution containing 12% by weight of PVDF), 90 g of acetylene black, and a suitable amount of NMP with a double-arm kneader. This paste was applied onto both sides of a positive electrode core member comprising a 15-μm-thick aluminum foil, dried, and rolled, to form a positive electrode with positive electrode active material layers. This positive electrode has a total thickness of 160 μm. The positive electrode was cut to a strip with a width of 56.5 mm.

(ii) Preparation of Negative Electrode

A negative electrode mixture paste was prepared by stirring 3 kg of artificial graphite, 75 g of BM-400B available from Zeon Corporation (aqueous dispersion containing 40% by weight of modified styrene butadiene rubber), 30 g of CMC, and a suitable amount of water with a double-arm kneader. This paste was applied onto both sides of a negative electrode core member comprising a 10-μm-thick copper foil, dried, and rolled to form a negative electrode with negative electrode active material layers. This negative electrode has a total thickness of 180 μm. The negative electrode was cut to a strip with a width of 57.5 mm.

(iii) Formation of Porous Heat-resistant Layer

A raw material paste was prepared by stirring 970 g of alumina with a median diameter of 0.3 μm (insulating filler), 375 g of BM-720H available from Zeon Corporation (NMP solution containing 8% by weight of modified polyacrylonitrile rubber (binder)), and a suitable amount of NMP with a double-arm kneader. This raw material paste was applied onto the surfaces of the negative electrode active material layers and dried with hot air of 130° C. at a flow rate of 1.5 m/min for 4 minutes, to form 5-μm thick porous heat-resistant layers. The porosity of each porous heat-resistant layer was 50%. The porosity was calculated from: the thickness of the porous heat-resistant layer determined by taking an SEM photo of a cross-section thereof; the amount of alumina in the porous heat-resistant layer of a given area obtained by X-ray fluorescence analysis; the true specific gravities of alumina and the binder; and the weight ratio between alumina and the binder.

(iv) Preparation of Electrolyte $LiPF_6$ was dissolved at a concentration of 1 mol/liter in a solvent mixture of ethylene carbonate (EC), dimethyl carbonate (DMC), and ethyl methyl carbonate (EMC) in a volume ratio of 1:1:1, and this solution was mixed with 3% by weight of vinylene carbonate, to prepare an electrolyte.

(v) Fabrication of Battery

A cylindrical electrode assembly was fabricated by winding the negative electrode with the porous heat-resistant layers formed on both sides thereof and the positive electrode, with a separator of a 10-μm-thick polyethylene micro-porous film (available from Celgard k. k., width: 60.7 mm) interposed therebetween.

This electrode assembly was then inserted into an iron cylindrical battery can (inner diameter: 18 mm) plated with nickel. It should be noted that an upper insulator plate and a lower insulator plate were disposed on top of and under the electrode assembly, respectively, but that they are very thin and hence their thicknesses are negligible. Thereafter, the upper part of the side wall of the battery can was provided with a step where the inner diameter of the battery can was reduced. The vertical section of the step is U-shaped, and the depth of the reduced-diameter step was 1.5 mm. The distance A from the inner bottom face of the battery can to the deepest part of the step was 60.5 mm.

Next, 5.5 g of an electrolyte was injected in the central hollow part of the electrode assembly to impregnate the electrode assembly with the electrolyte. Thereafter, a sealing plate was mounted on the step of the battery can, and the opening edge of the battery can was crimped onto the circumference of the sealing plate. This produced a cylindrical lithium secondary battery with an inner diameter of 18 mm, a height of 65.0 mm, and a design capacity of 2200 mAh. The B/A ratio (the ratio of the negative electrode width B (57.5 mm) to the distance A (60.5 mm)) was 0.950.

(Batteries 2 to 5)

Cylindrical lithium secondary batteries 2 to 5 were produced in the same manner as the battery 1, except that the negative electrode width B was changed to 58.5 mm, 59.2 mm, 60.2 mm, and 61.2 mm, respectively, that the positive electrode width was changed to 57.5 mm, 58.2 mm, 59.2 mm, and 60.2 mm, respectively, and that the design capacity was changed to 2239 mAh, 2266 mAh, 2305 mAh, and 2244 mAh, respectively. The B/A ratio of each battery was 0.967 (battery 2), 0.979 (battery 3), 0.995 (battery 4), and 1.012 (battery 5).

(Battery 6)

A cylindrical lithium secondary battery was produced in the same manner as the battery 3, except that the porous heat-resistant layer was formed on the surfaces of the positive electrode active material layers instead of the negative electrode active material layers.

(Battery 7)

A cylindrical lithium secondary battery was produced in the same manner as the battery 4, except that the porous heat-resistant layer was formed on the surfaces of the positive electrode active material layers instead of the negative electrode active material layers.

(Battery 8)

A cylindrical lithium secondary battery was produced in the same manner as the battery 3, except that the thickness of the porous heat-resistant layers was changed to 15 μm and that no separator was used to fabricate an electrode assembly.

(Battery 9)

A cylindrical lithium secondary battery was produced in the same manner as the battery 3, except that the alumina of the porous heat-resistant layers was changed to magnesia with the same median diameter.

(Battery 10)

A cylindrical lithium secondary battery was produced in the same manner as the battery 3, except that the alumina of the porous heat-resistant layers was changed to silica with the same median diameter.

(Battery 11)

A cylindrical lithium secondary battery was produced in the same manner as the battery 3, except that the alumina of the porous heat-resistant layers was changed to titania with the same median diameter.

(Battery 12)

A cylindrical lithium secondary battery was produced in the same manner as the battery 3, except that the alumina of the porous heat-resistant layers was changed to zirconia with the same median diameter.

(Battery 13)

A porous heat-resistant layer was formed as follows.

Dry anhydrous calcium chloride in an amount of 65 g was added to 1 kg of NMP, and dissolved completely by heating the mixture to 80° C. in a reaction vessel. The resultant NMP solution of calcium chloride was allowed to cool to room temperature, and 32 g of paraphenylene diamine was added thereto and dissolved completely. Thereafter, the reaction vessel was placed in a 20° C. constant temperature room, and 58 g of terephthalic acid dichloride was dropped to the NMP solution in 1 hour. This NMP solution was left in the 20° C. constant temperature room for 1 hour to cause polymerization reaction to proceed, to synthesize polyparaphenylene terephthalamide (hereinafter referred to as PPTA).

After the completion of the reaction, the NMP solution (polymerized liquid) was transferred from the constant temperature room to a vacuum room and stirred under reduced pressure for 30 minutes for degassing. The resultant polymerized liquid was diluted with the NMP solution of calcium chloride, to prepare an NMP solution of aramid resin with a PPTA concentration of 1.4% by weight.

The resultant NMP solution of aramid resin was applied onto one face of a separator with a doctor blade and dried with hot air of 80° C. (flow rate: 0.5 m/sec). The resultant aramid resin film was fully washed with pure water, to remove the calcium chloride and form micro-pores in the film. The film was then dried to form a 5-μm-thick porous heat-resistant layer on one face of the separator. The porosity of the porous heat-resistant layer was 48%. An electrode assembly was fabricated such that the porous heat-resistant layer was in contact with the positive electrode. Porous heat-resistant layers were not formed on the negative electrode active material layers. Except for the above, a cylindrical lithium secondary battery was produced in the same manner as the battery 3.

(Battery 14)

A porous heat-resistant layer was formed as follows.

Trimellitic acid anhydride monochloride in an amount of 21 g and 20 g of diamino diphenyl ether were added to 1 kg of NMP, and they were mixed together at room temperature to prepare an NMP solution of polyamic acid (polyamic acid concentration: 3.9% by weight). The resultant NMP solution of polyamic acid was applied onto one face of a separator with a doctor blade. The resultant coating film was dried with hot air of 80° C. (flow rate 0.5 m/sec) to cause cyclodehydration of the polyamic acid, to form a polyamide imide. In this way, a 5-μm-thick porous heat-resistant layer was formed on one face of the separator. The porosity of the porous heat-resistant layer was 47%. An electrode assembly was fabricated such that the porous heat-resistant layer was in contact with the positive electrode. Porous heat-resistant layers were not formed on the negative electrode active material layers. Except for this, a cylindrical lithium secondary battery was produced in the same manner as the battery 3.

(Battery 15)

An NMP solution of aramid resin prepared in the same manner as in the battery 13 was applied onto a smooth stainless steel (SUS) plate with a doctor blade, and the resultant coating film was dried at 120° C. under reduced pressure for 10 hours. The coating film was then separated from the SUS plate, to obtain a 15-μm thick porous heat-resistant layer in the form of an independent sheet. The porosity of the porous heat-resistant layer was 51%. An electrode assembly was fabricated by winding the positive electrode and the negative electrode, with this sheet of porous heat-resistant layer interposed therebetween, but without a separator. Porous heat-resistant layers were not formed on the negative electrode active material layers. Except for the above, a cylindrical lithium secondary battery was produced in the same manner as the battery 3.

(Battery 16)

An NMP solution of polyamic acid prepared in the same manner as in the battery 14 was applied onto a smooth stainless steel (SUS) plate with a doctor blade. The resultant coating film was dried with hot air of 80° C. (flow rate 0.5 m/sec) to cause cyclodehydration of the polyamic acid. The coating film was then separated from the SUS plate, to obtain a 15-μm thick porous heat-resistant layer in the form of an independent sheet. The porosity of the porous heat-resistant layer was 52%. An electrode assembly was fabricated by winding the positive electrode and the negative electrode, with this sheet of porous heat-resistant layer interposed therebetween, but without a separator. Porous heat-resistant layers were not formed on the negative electrode active material layers. Except for the above, a cylindrical lithium secondary battery was produced in the same manner as the battery 3.

(Battery 17)

Porous heat-resistant layers were formed as follows.

A raw material paste was prepared by stirring 995 g of alumina with a median diameter of 0.3 μm, 62.5 g of BM-720H available from Zeon Corporation, and a suitable amount of NMP with a double-arm kneader. This raw material paste was applied onto the surfaces of the negative electrode active material layers and dried with hot air of 130° C. at a flow rate of 1.5 m/min for 4 minutes, to form 5-μm thick porous heat-resistant layers. The porosity of each porous heat-resistant layer was 61%. Except for this, a cylindrical lithium secondary battery was produced in the same manner as the battery 3.

(Battery 18)

Porous heat-resistant layers were formed as follows.

A raw material paste was prepared by stirring 990 g of alumina with a median diameter of 0.3 μm, 125 g of BM-720H available from Zeon Corporation, and a suitable amount of NMP with a double-arm kneader. This raw material paste was applied onto the surfaces of the negative electrode active material layers and dried with hot air of 130° C.

at a flow rate of 1.5 m/min for 4 minutes, to form 5-μm thick porous heat-resistant layers. The porosity of each porous heat-resistant layer was 57%. Except for this, a cylindrical lithium secondary battery was produced in the same manner as the battery 3.

(Battery 19)

Porous heat-resistant layers were formed as follows.

A raw material paste was prepared by stirring 900 g of alumina with a median diameter of 0.3 μm, 1250 g of BM-720H available from Zeon Corporation, and a suitable amount of NMP with a double-arm kneader. This raw material paste was applied onto the surfaces of the negative electrode active material layers and dried with hot air of 130° C. at a flow rate of 1.5 m/min for 4 minutes, to form 5-μm thick porous heat-resistant layers. The porosity of each porous heat-resistant layer was 42%. Except for this, a cylindrical lithium secondary battery was produced in the same manner as the battery 3.

(Battery 20)

Porous heat-resistant layers were formed as follows.

A raw material paste was prepared by stirring 800 g of alumina with a median diameter of 0.3 μm, 2500 g of BM-720H available from Zeon Corporation, and a suitable amount of NMP with a double-arm kneader. This raw material paste was applied onto the surfaces of the negative electrode active material layers and dried with hot air of 130° C. at a flow rate of 1.5 m/min for 4 minutes, to form 5-μm thick porous heat-resistant layers. The porosity of each porous heat-resistant layer was 35%. Except for this, a cylindrical lithium secondary battery was produced in the same manner as the battery 3.

(Batteries 21 to 25)

Cylindrical lithium secondary batteries 21 to 25 were produced in the same manner as the battery 3, except that the flow rate of hot air was changed to 0.5 m/min, 1 m/min, 2 m/min, 5 m/min, and 8 m/min, respectively, in drying the raw material paste applied to form porous heat-resistant layers. The porosity of the porous heat-resistant layers of each battery was 30% (battery 21), 42% (battery 22), 60% (battery 23), 78% (battery 24), and 89% (battery 25).

(Battery 26)

A cylindrical lithium secondary battery was produced in the same manner as the battery 1, except that the thickness of the separator was changed to 15 μm and that no porous heat-resistant layer was formed.

(Battery 27)

A cylindrical lithium secondary battery was produced in the same manner as the battery 2, except that the thickness of the separator was changed to 15 μm and that no porous heat-resistant layer was formed.

(Battery 28)

A cylindrical lithium secondary battery was produced in the same manner as the battery 3, except that the thickness of the separator was changed to 15 μm and that no porous heat-resistant layer was formed.

(Battery 29)

A cylindrical lithium secondary battery was produced in the same manner as the battery 4, except that the thickness of the separator was changed to 15 μm and that no porous heat-resistant layer was formed.

(Battery 30)

A cylindrical lithium secondary battery was produced in the same manner as the battery 5, except that the thickness of the separator was changed to 15 μm and that no porous heat-resistant layer was formed.

The respective batteries were preliminarily charged and discharged twice and stored in an environment at 45° C. for 7 days. Thereafter, they were evaluated as follows. Tables 1, 2, and 3 summarize the features of the porous heat-resistant layers, battery design, and evaluation results, respectively.

(Inspection for Internal Short-circuit)

100 samples of each battery were produced. They were charged in an environment at 20° C. under the following conditions, and their open-circuit voltages were measured. Thereafter, the batteries were stored in an environment at 45° C. for 10 days and their open-circuit voltages were measured again. When the difference in open-circuit voltage between before and after the storage in the 45° C. environment was 0.3 V or more, such a battery was determined as being internally short-circuited. The occurrence rate of internal short-circuits is shown in Table 3.

Constant current charge: charge current 1500 mA/end of charge voltage 4.2 V

Constant voltage charge: charge voltage 4.2 V/end of charge current 100 mA (Drop Test)

Batteries having passed the internal short-circuit inspection were charged and discharged in the environment at 20° C. under the following conditions, and their discharge capacities were obtained.

Constant current charge: charge current 1500 mA/end of charge voltage 4.2 V

Constant voltage charge: charge voltage 4.2 V/end of charge current 100 mA

Constant current discharge: discharge current 2200 mA/end of discharge voltage 3 V Thereafter, these batteries were dropped from a height of 16 cm in the 20° C. environment 30 times and then charged and discharged under the above conditions, and their discharge capacities were obtained. The percentage of the discharge capacity after the drop test relative to the discharge capacity before the drop test was obtained. The results are shown as "drop resistance" in Table 3.

(Inspection for Internal Short-circuit after the Drop Test)

After the drop test, the batteries were inspected for internal short-circuits in the same manner as before the drop test. The results are shown as "occurrence rate of short-circuits after dropping" in Table 3.

(High-output Characteristic)

The respective batteries were charged and discharged in the environment at 20° C. under the following conditions, and their discharge capacities were obtained.

Constant current charge: charge current 1500 mA/end of charge voltage 4.2 V

Constant voltage charge: charge voltage 4.2 V/end of charge current 100 mA

Constant current discharge: discharge current 440 mA/end of discharge voltage 3 V Constant current charge: charge current 1500 mA/end of charge voltage 4.2 V Constant voltage charge: charge voltage 4.2 V/end of charge current 100 mA Constant current discharge: discharge current 4400 mA/end of discharge voltage 3 V The percentage of the capacity on 4400 mA discharge relative to the capacity on 440 mA discharge was obtained. The results are shown as "high-output characteristic" in Table 3.

(Nail Penetration Test)

The respective batteries were charged at a charge current of 2200 mA to a cut-off voltage of 4.35 V. In the environment at 20%, a 2.7-mm-diameter iron nail was driven into the side wall of each charged battery at a speed of 5 mm/sec, and the battery temperature was measured with a thermocouple fitted to the side wall of the battery. The temperatures after 90 seconds are shown in Table 3.

TABLE 1

| Battery | Porous heat resistant layer (μm) | Position of porous heat resistant layer | Separator (μm) | Filler | Content of binder (wt %) | Porosity (%) |
|---|---|---|---|---|---|---|
| 1 | 5 | Negative electrode | 10 | Alumina | 3 | 50 |
| 2 | 5 | Negative electrode | 10 | Alumina | 3 | 50 |
| 3 | 5 | Negative electrode | 10 | Alumina | 3 | 50 |
| 4 | 5 | Negative electrode | 10 | Alumina | 3 | 50 |
| 5 | 5 | Negative electrode | 10 | Alumina | 3 | 50 |
| 6 | 5 | Positive electrode | 10 | Alumina | 3 | 50 |
| 7 | 5 | Positive electrode | 10 | Alumina | 3 | 50 |
| 8 | 15 | Negative electrode | None | Alumina | 3 | 50 |
| 9 | 5 | Negative electrode | 10 | Magnesia | 3 | 50 |
| 10 | 5 | Negative electrode | 10 | Silica | 3 | 50 |
| 11 | 5 | Negative electrode | 10 | Titania | 3 | 50 |
| 12 | 5 | Negative electrode | 10 | Zirconia | 3 | 50 |
| 13 | 5 | Separator | 10 | Aramid | — | 48 |
| 14 | 5 | Separator | 10 | Polyamide imide | — | 47 |
| 15 | 15 | Independent sheet | None | Aramid | — | 51 |
| 16 | 15 | Independent sheet | None | Polyamide imide | — | 52 |
| 17 | 5 | Negative electrode | 10 | Alumina | 0.5 | 61 |
| 18 | 5 | Negative electrode | 10 | Alumina | 1 | 57 |
| 19 | 5 | Negative electrode | 10 | Alumina | 10 | 42 |
| 20 | 5 | Negative electrode | 10 | Alumina | 20 | 35 |
| 21 | 5 | Negative electrode | 10 | Alumina | 3 | 30 |
| 22 | 5 | Negative electrode | 10 | Alumina | 3 | 42 |
| 23 | 5 | Negative electrode | 10 | Alumina | 3 | 60 |
| 24 | 5 | Negative electrode | 10 | Alumina | 3 | 78 |
| 25 | 5 | Negative electrode | 10 | Alumina | 3 | 89 |
| 26 | None | — | 15 | — | — | — |
| 27 | None | — | 15 | — | — | — |
| 28 | None | — | 15 | — | — | — |
| 29 | None | — | 15 | — | — | — |
| 30 | None | — | 15 | — | — | — |

TABLE 2

| Battery | Negative electrode width B (mm) | Positive electrode width (mm) | Design capacity (mAh) | B/A |
|---|---|---|---|---|
| 1 | 57.5 | 56.5 | 2200 | 0.950 |
| 2 | 58.5 | 57.5 | 2239 | 0.967 |
| 3 | 59.2 | 58.2 | 2266 | 0.979 |
| 4 | 60.2 | 59.2 | 2305 | 0.995 |
| 5 | 61.2 | 60.2 | 2344 | 1.012 |
| 6 | 59.2 | 58.2 | 2266 | 0.979 |
| 7 | 60.2 | 59.2 | 2305 | 0.995 |
| 8 | 59.2 | 58.2 | 2266 | 0.979 |
| 9 | 59.2 | 58.2 | 2266 | 0.979 |
| 10 | 59.2 | 58.2 | 2266 | 0.979 |
| 11 | 59.2 | 58.2 | 2266 | 0.979 |
| 12 | 59.2 | 58.2 | 2266 | 0.979 |
| 13 | 59.2 | 58.2 | 2266 | 0.979 |
| 14 | 59.2 | 58.2 | 2266 | 0.979 |
| 15 | 59.2 | 58.2 | 2266 | 0.979 |
| 16 | 59.2 | 58.2 | 2266 | 0.979 |
| 17 | 59.2 | 58.2 | 2266 | 0.979 |
| 18 | 59.2 | 58.2 | 2266 | 0.979 |
| 19 | 59.2 | 58.2 | 2266 | 0.979 |
| 20 | 59.2 | 58.2 | 2266 | 0.979 |
| 21 | 59.2 | 58.2 | 2266 | 0.979 |
| 22 | 59.2 | 58.2 | 2266 | 0.979 |
| 23 | 59.2 | 58.2 | 2266 | 0.979 |
| 24 | 59.2 | 58.2 | 2266 | 0.979 |
| 25 | 59.2 | 58.2 | 2266 | 0.979 |
| 26 | 57.5 | 56.5 | 2200 | 0.950 |
| 27 | 58.5 | 57.5 | 2239 | 0.967 |
| 28 | 59.2 | 58.2 | 2266 | 0.979 |
| 29 | 60.2 | 59.2 | 2305 | 0.995 |
| 30 | 61.2 | 60.2 | 2344 | 1.012 |

TABLE 3

| Battery | Occurrence rate of short-circuits (%) | Drop resistance (%) | Occurrence rate of short-circuits after dropping (%) | High output characteristic (%) | Battery temperature after nail penetration (° C.) |
|---|---|---|---|---|---|
| 1 | 0 | 93.0 | 2 | 90.3 | 86 |
| 2 | 0 | 99.8 | 1 | 91.4 | 85 |
| 3 | 0 | 99.9 | 0 | 90.6 | 84 |
| 4 | 0 | 99.7 | 0 | 92.3 | 86 |
| 5 | 24 | 99.8 | 2 | 91.9 | 83 |
| 6 | 2 | 100.0 | 0 | 90.2 | 83 |
| 7 | 14 | 99.5 | 9 | 88.7 | 90 |
| 8 | 3 | 99.7 | 19 | 86.6 | 83 |
| 9 | 0 | 99.7 | 0 | 88.9 | 84 |
| 10 | 0 | 99.8 | 0 | 88.7 | 86 |
| 11 | 0 | 99.9 | 2 | 88.6 | 81 |
| 12 | 0 | 99.9 | 0 | 88.9 | 86 |
| 13 | 0 | 99.7 | 8 | 89.2 | 86 |
| 14 | 0 | 99.6 | 9 | 89.5 | 82 |
| 15 | 3 | 99.5 | 16 | 90.1 | 91 |
| 16 | 1 | 99.8 | 14 | 90.6 | 92 |
| 17 | 0 | 99.8 | 11 | 90.1 | 94 |
| 18 | 0 | 99.8 | 0 | 88.9 | 89 |
| 19 | 0 | 99.8 | 2 | 83.8 | 80 |
| 20 | 0 | 99.9 | 0 | 79.5 | 80 |
| 21 | 0 | 95.7 | 0 | 82.4 | 83 |
| 22 | 0 | 98.6 | 0 | 87.9 | 84 |
| 23 | 0 | 99.8 | 0 | 89.0 | 88 |
| 24 | 0 | 99.7 | 6 | 90.5 | 85 |
| 25 | 0 | 100.0 | 10 | 93.4 | 90 |
| 26 | 0 | 99.7 | 0 | 88.1 | 128 |
| 27 | 15 | 99.9 | 0 | 88.2 | 124 |
| 28 | 22 | 99.8 | 0 | 87.9 | 126 |
| 29 | 30 | 99.8 | 0 | 89.1 | 130 |
| 30 | 46 | 99.8 | 0 | 88.8 | 124 |

In the battery 1 where the negative electrode width B too small relative to the distance A from the step (restricting part) to the inner bottom face of the battery can, the capacity density was small and, in addition, the drop resistance was low. After the drop test, the battery 1 was disassembled for observation and it was found that the electrodes of the wound electrode assembly were displaced.

The battery 1 did not have an internal short-circuit due to the action of the porous heat-resistant layers, but the decrease in the effective area (the area in which the positive electrode and the negative electrode face each other) caused a capacity loss. Due to the provision of the porous heat-resistant layers, the electrode assembly is resistant to deformation, so that it cannot be firmly secured inside the battery can. This is probably the reason why the electrodes of the wound electrode assembly were displaced when repeatedly dropped.

On the other hand, in the case of the battery 5 where the negative electrode width B is too large relative to the distance A from the step to the inner bottom face of the battery can, the short-circuit resistance was low. The samples of the battery 5 that were determined as being internally short-circuited were disassembled for observation. As a result, it was found that the porous heat-resistant layers on the negative electrode surfaces were destroyed in an upper part of the electrode assembly. It was also found the separators were broken as well.

As for the batteries 2 to 4 with the B/A ratios within the range of 0.965 to 0.995, the short-circuit resistance was high and, in addition, the drop resistance was improved. The batteries of the present invention are provided with the porous heat-resistant layer in addition to the separator. Therefore, even if the negative electrode, which is larger than the positive electrode, deforms slightly in an upper part of the electrode assembly, the double-layer structure consisting of the porous heat-resistant layer and the separator allows the deformed portion to be insulated. Also, due to the high B/A ratios, the electrode assembly was firmly sandwiched between the step and the inner bottom face of the battery can. This is probably the reason of the improved drop resistance.

In the case of the batteries 26 to 30 having no porous heat-resistant layer, the drop resistance was good regardless of the position of the restricting part. It is believed that since the electrode assembly having no porous heat-resistant layer deforms to a suitable extent, it was firmly secured within the battery can. Probably for this reason, even if these batteries were dropped, the displacement of the electrodes of the wound electrode assembly that could result in a capacity loss was suppressed. However, these batteries 26 to 30 were markedly overheated on the nail penetration test. Also, in the batteries 27 to 29 whose restricting parts were provided at the same positions as those of the batteries 2 to 4, respectively, the short-circuit resistance was low. The negative electrodes of these batteries 27 to 29 are believed to be deformed slightly. However, since these batteries had no porous heat-resistant layer, prevention of an internal short-circuit was not possible when the separator broke due to the negative electrode deformation.

In the batteries 6 and 7, the porous heat-resistant layer was formed on the surfaces of the positive electrode active material layers. Of these two batteries, the battery 7 with a wider negative electrode exhibited a somewhat lower short-circuit resistance. This is probably because the porous heat-resistant layer was formed on the surfaces of the positive electrode active material layers that were narrower than the negative electrode active material layers and the negative electrode surface therefore came into contact with the upper edge of the positive electrode in an upper part of the electrode assembly.

With respect to the battery 8 having no separator, the short-circuit resistance after dropping was slightly low. The porous heat-resistant layer is more fragile in structure than the separator. Probably for the reason, the porous resistant layers were partially destroyed by the impact of dropping and a short-circuit occurred.

As for the batteries 13 and 14 having the porous heat-resistant layer made of heat-resistant resin on the surface of the separator, the short-circuit resistance after dropping was slightly low. The porous heat-resistant layer made of heat-resistant resin has a lower mechanical strength than that of the porous heat-resistant layer containing an insulating filler and a binder. Probably for this reason, a short-circuit occurred by the impact of dropping.

In the case of the batteries 15 and 16 having the independent sheet of porous heat-resistant layer and no separator, the short-circuit resistance after dropping was lower than that in the batteries 13 and 14. This is related to the fact that the porous heat-resistant layer made of heat-resistant resin has poor strength and that the strength of the porous heat-resistant layer is not improved due to the absence of a separator.

With respect to the battery 17 with the binder content of the porous heat-resistant layer of 0.5% by weight, the short-circuit resistance after dropping was somewhat low. This is probably because the low binder content weakened the adhesion of filler particles, thereby resulting in poor mechanical strength of the porous heat-resistant layers.

On the other hand, in the case of the battery 20 with the binder content of 20% by weight, the high-output characteristic was low. This is probably because the excessive binder lowered the porosity of the porous heat-resistant layers and, in addition, the excessive binder was swollen with the electrolyte, thereby closing the pores of the porous heat-resistant layers and lowering the ionic conductivity. On the other hand, in the case of the batteries 18 to 19 with the binder contents within the range of 1 to 10% by weight, both the short-circuit resistance and the high-output characteristic were good.

In the battery 21 with the porous heat-resistant layer porosity of 30% due to the controlled drying condition, the drop resistance was somewhat low. The reason is probably as follows. Because of the low porosity, the porous heat-resistant layers were not sufficiently impregnated with the electrolyte, so that the swelling of the electrode assembly was small. Thus, the electrode assembly was not prevented from moving when dropped. In the case of the battery 25 with the porous heat-resistant layer porosity of 89%, the short-circuit resistance after dropping was somewhat low. This is probably due to the poor mechanical strength of the porous heat-resistant layers.

On the other hand, in the case of the batteries 22 to 24 with the porous heat-resistant layer porosities within the range of 40 to 80%, both the drop resistance and the short-circuit resistance after dropping were good. The reason is probably as follows. Due to the optimized porosities, the mechanical strength of the porous heat-resistant layers was maintained. Further, the porous heat-resistant layers were swollen with the electrolyte to a suitable extent. As a result, the movement of the electrode assembly was prevented.

EXAMPLE 2

In this example, a prismatic lithium secondary battery as illustrated in FIG. 2 is described.
(Battery 31)

An electrode assembly was produced in the same manner as in Example 1 except for the following differences. The total thickness of the positive electrode was changed to 150 μm, and the width of the positive electrode was changed to 42.7 mm. The total thickness of the negative electrode was changed to 150 μm, and the width of the negative electrode was changed to 43.7 mm. The width of the separator was changed to 47 mm. The shape of the electrode assembly was changed to an elliptically cylindrical shape.

The resultant electrode assembly was inserted in an aluminum prismatic battery can with a height of 49 mm (bottom thickness: 0.5 mm), a width of 34 mm, and a thickness of 5.2 mm. After a 1.5-mm-thick insulator was mounted on top of the electrode assembly, 2.5 g of the same electrolyte as that of Example 1 was injected into the battery can. The distance A from the inner bottom face of the battery can to the lower face of the insulator was 46.0 mm. It should be noted that the lower part of the electrode assembly is insulated from the battery can by an insulating sheet, but that since this insulating sheet is very thin, its thickness is negligible.

Thereafter, a 1.0-mm-thick rectangular sealing plate was mounted on the open top of the battery can, and the opening edge of the battery can and the periphery of the sealing plate were welded together with a laser. This completed a prismatic lithium secondary battery with a height of 50 mm, a width of 34 mm, a thickness of 5.2 mm, and a design capacity of 950 mAh. The B/A ratio (the ratio of the negative electrode width B (43.7 mm) to the distance A (46.0 mm)) was 0.95.

(Batteries 32 to 35)

Prismatic lithium secondary batteries 32 to 35 were produced in the same manner as the battery 31, except that the negative electrode width B was changed to 44.6 mm, 45 mm, 45.7 mm, and 46.5 mm, respectively, that the positive electrode width was changed to 43.6 mm, 44 mm, 44.7 mm, and 45.5 mm, respectively, and that the design capacity was changed to 970 mAh, 979 mAh, 994 mAh, and 1012 mAh, respectively. The B/A ratio of each battery was 0.970 (battery 32), 0.978 (battery 33), 0.993 (battery 34), and 1.011 (battery 35).

(Batteries 36 and 37)

Prismatic lithium secondary batteries 36 and 37 were produced in the same manner as the batteries 33 and 34, respectively, except that the porous heat-resistant layer was formed on the surfaces of the positive electrode active material layers instead of the negative electrode active material layers.

(Battery 38)

A prismatic lithium secondary battery was produced in the same manner as the battery 33, except that the thickness of the porous heat-resistant layers was changed to 15 μm and that no separator was used to fabricate an electrode assembly.

(Batteries 39 to 42)

Prismatic lithium secondary batteries 39 to 42 were produced in the same manner as the battery 33, except that the alumina of the porous heat-resistant layers was changed to magnesia, silica, titania, and zirconia, respectively, with the same median diameter.

(Batteries 43 to 50)

Prismatic lithium secondary batteries 43 to 50 were produced in the same manner as the battery 33, except for the use of porous heat-resistant layers that were the same as those of the batteries 13 to 20 in Example 1, respectively.

(Batteries 51 to 55)

Prismatic lithium secondary batteries 51 to 55 were produced in the same manner as the battery 33, except that the flow rate of the hot air was changed to 0.5 m/min, 1 m/min, 2 m/min, 5 m/min, and 8 m/min, respectively, in drying the raw material paste applied to form the porous heat-resistant layers. The porosity of the porous heat-resistant layers of each battery was 30% (battery 51), 42% (battery 52), 60% (battery 53), 78% (battery 54), or 89% (battery 55).

(Batteries 56 to 60)

Prismatic lithium secondary batteries 56 to 60 were produced in the same manner as the batteries 31 to 35, respectively, except that the thickness of the separator was changed to 15 μm and that no porous heat-resistant layer was provided.

The respective batteries were preliminarily charged and discharged twice and then stored in an environment at 45° C. for 7 days. Thereafter, they were evaluated in the following manner. Tables 4, 5, and 6 summarize the features of the porous heat-resistant layers, battery design, and evaluation results, respectively.

(Inspection for Internal Short-circuit)

The batteries were inspected for short-circuits in the same manner as in Example 1, except that they were charged under the following conditions. The results are shown in Table 6.

Constant current charge: charge current 665 mA/end of charge voltage 4.2 V

Constant voltage charge: charge voltage 4.2 V/end of charge current 100 mA (Drop Test)

The batteries were evaluated for "drop resistance" in the same manner as in Example 1, except that they were charged and discharged under the following conditions. The results are shown in Table 6.

Constant current charge: charge current 665 mA/end of charge voltage 4.2 V

Constant voltage charge: charge voltage 4.2 V/end of charge current 100 mA

Constant current discharge: discharge current 950 mA/end of discharge voltage 3 V (Inspection for Internal Short-circuit after the Drop Test)

After the drop test, the batteries were inspected for internal short-circuits in the same manner as before the drop test. The results are shown as "occurrence rate of short-circuits after dropping" in Table 6.

(High-output Characteristic)

In an environment at 20%, the respective batteries were charged and discharged under the following conditions, and their discharge capacities were obtained.

Constant current charge: charge current 665 mA/end of charge voltage 4.2 V

Constant voltage charge: charge voltage 4.2 V/end of charge current 100 mA

Constant current discharge: discharge current 190 mA/end of discharge voltage 3 V Constant current charge: charge current 665 mA/end of charge voltage 4.2 V Constant voltage charge: charge voltage 4.2 V/end of charge current 100 mA Constant current discharge: discharge current 1900 mA/end of discharge voltage 3 V The percentage of the capacity on 1900 mA discharge relative to the capacity on 190 mA discharge was obtained. The results are shown as "high-output characteristic" in Table 6.

(Nail Penetration Test)

The respective batteries were charged at a charge current of 950 mA to a cut-off voltage of 4.35 V. In the same manner as in Example 1, a nail was driven therein and the temperature after 90 seconds was evaluated. The results are shown in Table 6.

TABLE 4

| Battery | Porous heat resistant layer (μm) | Position of porous heat resistant layer | Separator (μm) | Filler | Content of binder (wt %) | Porosity (%) |
|---|---|---|---|---|---|---|
| 31 | 5 | Negative electrode | 10 | Alumina | 3 | 50 |
| 32 | 5 | Negative electrode | 10 | Alumina | 3 | 50 |
| 33 | 5 | Negative electrode | 10 | Alumina | 3 | 50 |
| 34 | 5 | Negative electrode | 10 | Alumina | 3 | 50 |
| 35 | 5 | Negative electrode | 10 | Alumina | 3 | 50 |
| 36 | 5 | Positive electrode | 10 | Alumina | 3 | 50 |
| 37 | 5 | Positive electrode | 10 | Alumina | 3 | 50 |
| 38 | 15 | Negative electrode | None | Alumina | 3 | 50 |
| 39 | 5 | Negative electrode | 10 | Magnesia | 3 | 50 |
| 40 | 5 | Negative electrode | 10 | Silica | 3 | 50 |
| 41 | 5 | Negative electrode | 10 | Titania | 3 | 50 |
| 42 | 5 | Negative electrode | 10 | Zirconia | 3 | 50 |
| 43 | 5 | Separator | 10 | Aramid | — | 48 |
| 44 | 5 | Separator | 10 | Polyamide imide | — | 47 |
| 45 | 15 | Independent sheet | None | Aramid | — | 51 |
| 46 | 15 | Independent sheet | None | Polyamide imide | — | 52 |
| 47 | 5 | Negative electrode | 10 | Alumina | 0.5 | 61 |
| 48 | 5 | Negative electrode | 10 | Alumina | 1 | 57 |
| 49 | 5 | Negative electrode | 10 | Alumina | 10 | 42 |
| 50 | 5 | Negative electrode | 10 | Alumina | 20 | 35 |
| 51 | 5 | Negative electrode | 10 | Alumina | 3 | 30 |
| 52 | 5 | Negative electrode | 10 | Alumina | 3 | 42 |
| 53 | 5 | Negative electrode | 10 | Alumina | 3 | 60 |
| 54 | 5 | Negative electrode | 10 | Alumina | 3 | 78 |
| 55 | 5 | Negative electrode | 10 | Alumina | 3 | 89 |
| 56 | None | — | 15 | — | — | — |
| 57 | None | — | 15 | — | — | — |
| 58 | None | — | 15 | — | — | — |
| 59 | None | — | 15 | — | — | — |
| 60 | None | — | 15 | — | — | — |

TABLE 5

| Battery | Negative electrode width B (mm) | Positive electrode width (mm) | Design capacity (mAh) | B/A |
|---|---|---|---|---|
| 31 | 43.7 | 42.7 | 950 | 0.950 |
| 32 | 44.6 | 43.6 | 970 | 0.970 |
| 33 | 45 | 44 | 979 | 0.978 |
| 34 | 45.7 | 44.7 | 994 | 0.993 |
| 35 | 46.5 | 45.5 | 1012 | 1.011 |
| 36 | 45 | 44 | 979 | 0.978 |
| 37 | 45.7 | 44.7 | 994 | 0.993 |
| 38 | 45 | 44 | 979 | 0.978 |
| 39 | 45 | 44 | 979 | 0.978 |
| 40 | 45 | 44 | 979 | 0.978 |
| 41 | 45 | 44 | 979 | 0.978 |
| 42 | 45 | 44 | 979 | 0.978 |
| 43 | 45 | 44 | 979 | 0.978 |
| 44 | 45 | 44 | 979 | 0.978 |
| 45 | 45 | 44 | 979 | 0.978 |
| 46 | 45 | 44 | 979 | 0.978 |
| 47 | 45 | 44 | 979 | 0.978 |
| 48 | 45 | 44 | 979 | 0.978 |
| 49 | 45 | 44 | 979 | 0.978 |
| 50 | 45 | 44 | 979 | 0.978 |
| 51 | 45 | 44 | 979 | 0.978 |
| 52 | 45 | 44 | 979 | 0.978 |
| 53 | 45 | 44 | 979 | 0.978 |
| 54 | 45 | 44 | 979 | 0.978 |
| 55 | 45 | 44 | 979 | 0.978 |
| 56 | 43.7 | 42.7 | 950 | 0.950 |
| 57 | 44.6 | 43.6 | 970 | 0.970 |
| 58 | 45 | 44 | 979 | 0.978 |
| 59 | 45.7 | 44.7 | 994 | 0.993 |
| 60 | 46.5 | 45.5 | 1012 | 1.011 |

TABLE 6

| Battery | Occurrence rate of short-circuits (%) | Drop resistance (%) | Occurrence rate of short-circuits after dropping (%) | High output characteristic (%) | Battery temperature after nail penetration (° C.) |
|---|---|---|---|---|---|
| 31 | 0 | 93.3 | 1 | 90.4 | 83 |
| 32 | 0 | 98.0 | 0 | 91.2 | 86 |
| 33 | 0 | 99.9 | 0 | 90.1 | 80 |
| 34 | 0 | 99.7 | 0 | 89.4 | 82 |
| 35 | 20 | 98.8 | 0 | 88.9 | 83 |
| 36 | 4 | 99.8 | 3 | 90.2 | 86 |
| 37 | 11 | 99.7 | 12 | 91.3 | 86 |
| 38 | 2 | 99.8 | 13 | 87.8 | 93 |
| 39 | 0 | 99.7 | 0 | 89.1 | 86 |
| 40 | 0 | 99.9 | 0 | 90.1 | 86 |
| 41 | 0 | 99.8 | 0 | 88.9 | 82 |
| 42 | 0 | 99.8 | 0 | 90.4 | 84 |
| 43 | 0 | 99.6 | 10 | 88.8 | 82 |
| 44 | 0 | 99.7 | 11 | 90.1 | 84 |
| 45 | 0 | 99.8 | 12 | 91.2 | 85 |
| 46 | 0 | 99.9 | 11 | 90.7 | 82 |
| 47 | 0 | 99.9 | 8 | 90.4 | 87 |
| 48 | 0 | 99.8 | 0 | 91.4 | 82 |
| 49 | 0 | 99.7 | 0 | 85.3 | 81 |
| 50 | 0 | 99.9 | 0 | 80.3 | 78 |
| 51 | 0 | 96.0 | 0 | 87.7 | 83 |
| 52 | 0 | 99.8 | 0 | 88.2 | 88 |
| 53 | 0 | 100.0 | 0 | 89.4 | 81 |
| 54 | 0 | 99.7 | 0 | 90.0 | 85 |
| 55 | 2 | 99.8 | 14 | 92.1 | 94 |
| 56 | 0 | 99.7 | 0 | 88.4 | 126 |
| 57 | 15 | 99.9 | 0 | 88.9 | 123 |
| 58 | 20 | 99.8 | 0 | 90.2 | 131 |
| 59 | 28 | 99.8 | 0 | 89.1 | 124 |
| 60 | 48 | 99.8 | 5 | 90.1 | 130 |

In the battery 31 where the negative electrode width B is too small relative to the distance A from the lower face of the insulator (restricting part) to the inner bottom face of the battery can, the capacity density was small and, in addition, the drop resistance was low. After the drop test, the battery 31 was disassembled for observation and it was found that the electrodes of the wound electrode assembly were displaced.

The battery 31 did not have an internal short-circuit due to the action of the porous heat-resistant layers, but the decrease in the effective area (the area in which the positive electrode and the negative electrode face each other) caused a capacity loss. Due to the provision of the porous heat-resistant layers, the electrode assembly is resistant to deformation, so that it cannot be firmly secured inside the battery can. This is probably the reason why the electrodes of the wound electrode assembly were displaced when repeatedly dropped.

On the other hand, in the case of the battery 35 where the negative electrode width B is too large relative to the distance A from the lower face of the insulator to the inner bottom face of the battery can, the short-circuit resistance was low. The samples of the battery 35 that were determined as being internally short-circuited were disassembled for observation. As a result, it was found that the porous heat-resistant layers on the negative electrode surfaces were destroyed in an upper part of the electrode assembly. It was also found the separators were broken as well.

As for the batteries 33 and 34 with the B/A ratios within the range of 0.975 to 0.995, the short-circuit resistance was high and, in addition, the drop resistance was improved. The batteries of the present invention are provided with the porous heat-resistant layer in addition to the separator. Therefore, even if the negative electrode, which is larger than the positive electrode, deforms slightly in an upper part of the electrode assembly, the double-layer structure consisting of the porous heat-resistant layer and the separator allows the deformed portion to be insulated. Also, due to the high B/A ratios, the electrode assembly was firmly sandwiched between the lower face of the insulator and the inner bottom face of the battery can. This is probably the reason of the improved drop resistance.

However, in the battery 32 with the B/A ratio within the range of 0.965 to 0.975, the drop resistance was slightly lower than that in the cylindrical battery 2 (Example 1) with the same B/A ratio range. In the case of cylindrical batteries, the step (restricting part) is gently V-shaped or U-shaped in cross-section. Thus, the top of the electrode assembly is pressed by the slope of the step. On the other hand, in the case of prismatic batteries, the lower face of the insulator (restricting part) is flat and has no such slope as that of the step. This is probably the reason of the difference in the more effective B/A ratio range.

In the case of the batteries 56 to 60 having no porous heat-resistant layer, the drop resistance was good regardless of the position of the restricting part. It is believed that since the electrode assembly having no porous heat-resistant layer deforms to a suitable extent, it was firmly secured within the battery can. Probably for this reason, even if these batteries were dropped, the displacement of the electrodes of the wound electrode assembly that could result in a capacity loss was suppressed. However, these batteries 56 to 60 were markedly overheated on the nail penetration test. Also, in the batteries 57 to 59 whose restricting parts were provided at the same positions as those of the batteries 32 to 34, respectively, the short-circuit resistance was low. The negative electrodes of these batteries 57 to 59 are believed to be deformed slightly. However, since these batteries had no porous heat-resistant layer, prevention of an internal short-circuit was not possible when the separator broke due to the negative electrode deformation.

In the batteries 36 and 37, the porous heat-resistant layer was formed on the surfaces of the positive electrode active material layers. Of these two batteries, the battery 37 with a wider negative electrode exhibited a somewhat lower short-circuit resistance. This is probably because the porous heat-resistant layer was formed on the surfaces of the positive electrode active material layers that were narrower than the negative electrode active material layers and the negative electrode surface therefore came into contact with the upper edge of the positive electrode in an upper part of the electrode assembly.

With respect to the battery 38 having no separator, the short-circuit resistance after dropping was slightly low. The porous heat-resistant layer is more fragile in structure than the separator. Probably for the reason, the porous resistant layers were partially destroyed by the impact of dropping and a short-circuit occurred.

As for the batteries 43 and 44 having the porous heat-resistant layer made of heat-resistant resin on the surface of the separator, the short-circuit resistance after dropping was slightly low. The porous heat-resistant layer made of heat-resistant resin has a lower mechanical strength than that of the porous heat-resistant layer containing an insulating filler and a binder. Probably for this reason, a short-circuit occurred by the impact of dropping.

In the case of the batteries 45 and 46 having the independent sheet of porous heat-resistant layer and no separator, the short-circuit resistance after dropping was lower than that in the batteries 43 and 44. This is related to the fact that the porous heat-resistant layer made of heat-resistant resin has poor strength and that the strength of the porous heat-resistant layer is not improved due to the absence of a separator.

With respect to the battery 47 with the binder content of the porous heat-resistant layer of 0.5% by weight, the short-circuit resistance after dropping was somewhat low. This is probably because the low binder content weakened the adhesion of filler particles, thereby resulting in poor mechanical strength of the porous heat-resistant layers.

On the other hand, in the case of the battery 50 with the binder content of 20% by weight, the high-output characteristic was somewhat low. This is probably because the excessive binder lowered the porosity of the porous heat-resistant layers and, in addition, the excessive binder was swollen with the electrolyte, thereby closing the pores of the porous heat-resistant layers and lowering the ionic conductivity. On the other hand, in the case of the batteries 48 to 49 with the binder contents within the range of 1 to 10% by weight, both the short-circuit resistance and the high-output characteristic were good.

In the battery 51 with the porous heat-resistant layer porosity of 30% due to the controlled drying condition, the drop resistance was somewhat low. The reason is probably as follows. Because of the low porosity, the porous heat-resistant layers were not sufficiently impregnated with the electrolyte, so that the swelling of the electrode assembly was small. Thus, the electrode assembly was not prevented from moving when dropped. In the case of the battery 55 with the porous heat-resistant layer porosity of 89%, the short-circuit resistance after dropping was somewhat low. This is probably due to the poor mechanical strength of the porous heat-resistant layers.

On the other hand, in the case of the batteries 52 to 54 with the porous heat-resistant layer porosities within the range of 40 to 80%, both the drop resistance and the short-circuit resistance after dropping were good. The reason is probably as follows. Due to the optimized porosities, the mechanical strength of the porous heat-resistant layers was maintained.

Further, the porous heat-resistant layers were swollen with the electrolyte to a suitable extent. As a result, the movement of the electrode assembly was prevented.

Since the lithium secondary battery of the present invention has an excellent resistance to short-circuits and heat and a high level of safety and is unlikely to suffer a capacity loss due to impact such as dropping, it can be used as a power source for any portable appliances, for example, personal digital assistants and portable electronic appliances. The lithium secondary battery of the present invention can also be used as a power source for small-sized power storage devices for home use, two-wheel motor vehicles, electric vehicles, and hybrid electric vehicles, and its application is not particularly limited.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium secondary battery comprising: a battery can having a bottom, a side wall, and an open top; an electrode assembly; a non-aqueous electrolyte; and a sealing plate covering the open top of said battery can that accommodates said electrode assembly and said electrolyte, wherein:

said electrode assembly comprises a strip-like positive electrode and a strip-like negative electrode that are wound together with a porous heat-resistant layer interposed between the positive and negative electrodes, said positive electrode comprising a positive electrode core member and a positive electrode active material layer carried on the positive electrode core member, said negative electrode comprising a negative electrode core member and a negative electrode active material layer carried on the negative electrode core member, and a separator that comprises a micro-porous film including polyolefin, said separator being interposed between said porous heat-resistant layer and said positive electrode, said battery has a restricting part for restricting vertical movement of said electrode assembly, a distance A from said restricting part to an inner face of the bottom of said battery can and a width B of said negative electrode satisfying the relation: $0.965 \leqq B/A \leqq 0.995$, said porous heat-resistant layer comprises an insulating filler and a binder, an amount of said binder being 2 to 8 parts by weight per 100 parts by weight of said insulating filler, said porous heat-resistant layer is formed on a surface of said negative electrode active material layer, said porous heat-resistant layer has a porosity of 40 to 60%, and the width of said negative electrode is larger than that of said positive electrode.

2. The lithium secondary battery in accordance with claim 1, wherein said insulating filler comprises an inorganic oxide.

3. The lithium secondary battery in accordance with claim 2, wherein said inorganic oxide comprises at least one selected from the group consisting of alumina, silica, magnesia, titania, and zirconia.

4. The lithium secondary battery in accordance with claim 1, wherein said electrode assembly is substantially cylindrical, said battery can is cylindrical, and said restricting part is a step of said battery can with a reduced inner diameter that is provided in an upper part of the side wall of the battery can.

5. The lithium secondary battery in accordance with claim 1, further comprising an insulator that is positioned between said electrode assembly and said sealing plate, wherein said electrode assembly is substantially elliptically cylindrical, said battery can is prismatic, and said restricting part is a lower face of the insulator.

6. The lithium secondary battery in accordance with claim 5, wherein the distance A from said restricting part to the inner face of the bottom of said battery can and the width B of said negative electrode satisfy the relation:

$0.975 \leqq B/A \leqq 0.995$.

* * * * *